(12) United States Patent
Hazama

(10) Patent No.: US 9,277,034 B2
(45) Date of Patent: Mar. 1, 2016

(54) SPRING UNIT AND SLIDING MECHANISM

(75) Inventor: Yuji Hazama, Ichihara (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 222 days.

(21) Appl. No.: 13/582,752

(22) PCT Filed: Mar. 10, 2011

(86) PCT No.: PCT/JP2011/055706
§ 371 (c)(1),
(2), (4) Date: Sep. 5, 2012

(87) PCT Pub. No.: WO2011/111799
PCT Pub. Date: Sep. 15, 2011

(65) Prior Publication Data
US 2012/0325034 A1   Dec. 27, 2012

(30) Foreign Application Priority Data
Mar. 11, 2010  (JP) .................................. 2010-054957

(51) Int. Cl.
*H04M 1/02* (2006.01)
*G06F 1/16* (2006.01)

(52) U.S. Cl.
CPC ........... *H04M 1/0237* (2013.01); *G06F 1/1624* (2013.01); *Y10T 74/18896* (2015.01)

(58) Field of Classification Search
CPC .............................. H01M 1/0237; F16F 1/027
USPC ................... 379/433.12; 455/575.4; 267/165
See application file for complete search history.

(56) References Cited

U.S. PATENT DOCUMENTS

| 3,816,862 | A  | * | 6/1974 | Shibata et al. ........... 297/452.51 |
| 7,774,033 | B2 | * | 8/2010 | Lee .............................. 455/575.4 |
| 7,967,346 | B2 | * | 6/2011 | Kim et al. ........................ 292/80 |
| 2005/0164753 | A1 | | 7/2005 | Kato |

(Continued)

FOREIGN PATENT DOCUMENTS

| CN | 101278488 A | 10/2008 |
| JP | 2005-210649 A | 8/2005 |

(Continued)

OTHER PUBLICATIONS

Office Action dated Dec. 13, 2013 for Application No. EP 11753457.8.

(Continued)

*Primary Examiner* — William C Joyce
(74) *Attorney, Agent, or Firm* — Ladas & Parry LLP

(57) ABSTRACT

A spring unit including a zigzag spring 40A, 40B; a first sliding unit 20A including a first spring securing part 22 securing a first end of the spring, a first spring accommodating part 28A, 28B accommodating the spring; first slide guiding parts 25 on both sides of the first sliding unit; a second sliding unit 30A including a second spring securing part 32 securing a second end of the spring, a second spring accommodating part 36A, 36B accommodating the spring, second slide guiding parts 35 on both sides of the second sliding unit, wherein the first and second slide guiding parts 20A and 30A are engaged to mutually slide, and the spring 40A, 40B is held inside a space formed between the first and second spring accommodating parts 28A, 28B, 36A, and 36B while the first and second slide guiding parts 25 and 35 are engaged.

12 Claims, 21 Drawing Sheets

(56) References Cited

U.S. PATENT DOCUMENTS

| | | | |
|---|---|---|---|
| 2007/0006421 A1 | 1/2007 | Park et al. | |
| 2007/0155451 A1 | 7/2007 | Lee | |
| 2008/0058039 A1 | 3/2008 | Lee et al. | |
| 2008/0106856 A1 | 5/2008 | Chung et al. | |
| 2008/0207284 A1* | 8/2008 | Jung et al. | 455/575.4 |
| 2008/0254844 A1 | 10/2008 | Lee | |
| 2009/0005135 A1 | 1/2009 | Lindgren et al. | |
| 2009/0035056 A1 | 2/2009 | Kim et al. | |
| 2009/0168339 A1 | 7/2009 | Lee | |
| 2010/0113110 A1* | 5/2010 | Lee | 455/575.4 |

FOREIGN PATENT DOCUMENTS

| | | |
|---|---|---|
| JP | 2007-16997 A | 1/2007 |
| JP | 2008-501288 A | 1/2008 |
| JP | 2008-506299 A | 2/2008 |
| JP | 3149892 U | 4/2009 |
| JP | 2009-141801 A | 6/2009 |
| KR | 100678037 B1 | 1/2007 |
| KR | 20080090884 A | 10/2008 |

OTHER PUBLICATIONS

Non-English Action for Korean Application No. 10-2012-7023270 and an English-language version thereof.
espacenet English abstract of KR 20080090884 A.
espacenet English abstract of KR 100678037 B1.
Office Action dated Mar. 20, 2014 for corresponding Chinese Application No. 201180012250.1.
Machine English Translation of JP 3149892U Published Apr. 16, 2009.
Patent English Abstract and Machine English Translation of JP 2005/210649 A Published Aug. 4, 2005.
Patent English Abstract and Machine English Translation of JP 2009-141801 A Published Jun. 25, 2009.
Machine English Translation of JP 2008-506299 A Published Feb. 28, 2008.
Patent English Abstract and Machine English Translation of JP 2007-16997 A Published Jan. 25, 2007.
Machine English Translation of JP 2008-501288 A Published Jan. 17, 2008.

* cited by examiner

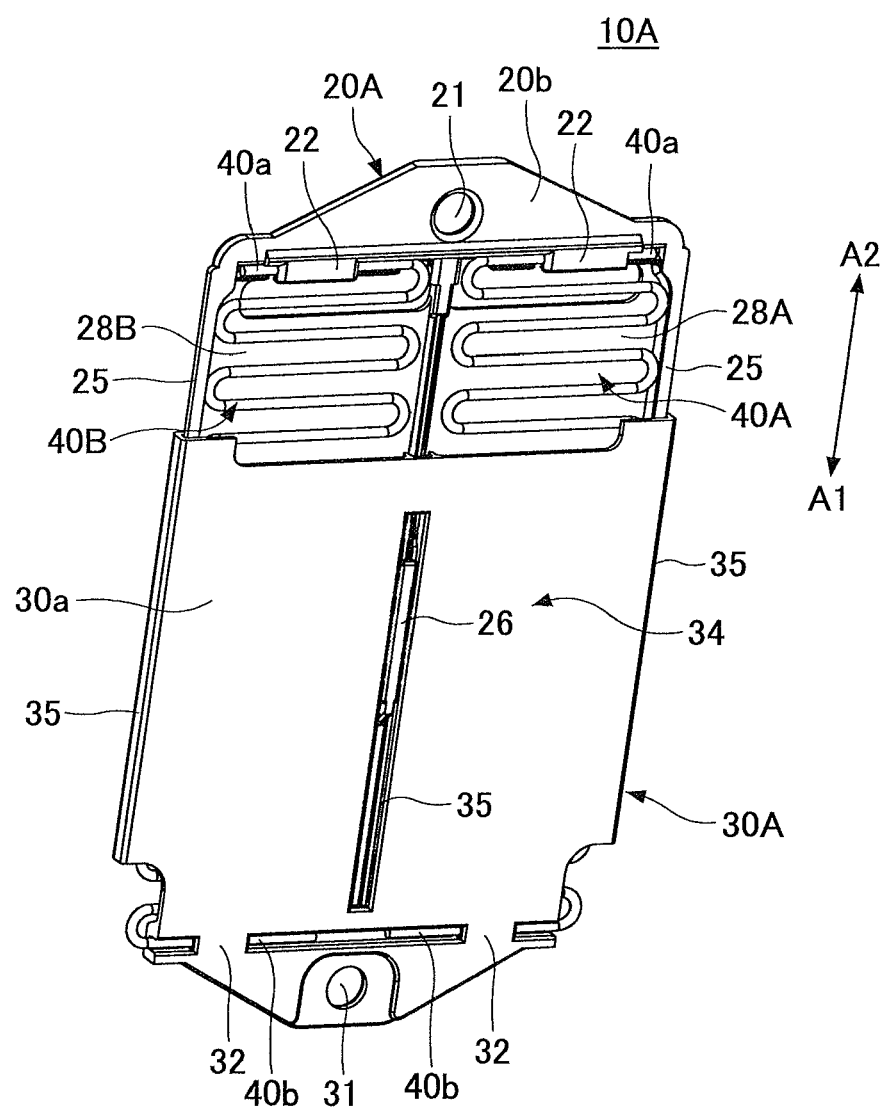

SPRING UNIT AND SLIDING MECHANISM

TECHNICAL FIELD

The present invention generally relates to a spring unit and a sliding mechanism, and more specifically, to a spring unit and a sliding mechanism using a zigzag spring.

BACKGROUND ART

For example, an exemplary electronic apparatus includes a fixed casing having operations keys and a movable casing which has a liquid crystal display device or the like and is slidable relative to the fixed casing such as a portable phone and a game machine. A sliding mechanism may be installed in this electronic apparatus to enable a slide motion of the movable casing relative to the fixed casing. One type of the sliding mechanism is disclosed in, for example, Patent Document 1.

In this sliding mechanism applied to the electronic apparatus, a spring unit is assembled inside the electronic apparatus. When the movable casing is opened, the movable casing is biased so that the movable casing becomes in a closed state until the movable casing moves to a predetermined position. When the movable casing is opened beyond the predetermined position, the movable casing is biased so that the movable casing becomes in an opened state. Thus, it is possible to improve operability of the electronic apparatus.

Although various types of springs are used for the spring unit, a spring unit applied with a zigzag spring is disclosed in Patent Document 2. When the zigzag spring is used, it is possible to make thinner the spring unit.

[Patent Document 1] Japanese Laid-open Patent Publication No. 2005-210649

[Patent Document 2] Japanese Registered Utility Model No. 3149892

DISCLOSURE OF THE INVENTION

Problems to be Solved by the Invention

Although a spring unit using a zigzag spring can be minimized or thinned, the zigzag spring is apt to buckle in a direction different from the desired expanding and contracting directions. In the spring unit disclosed in Patent Document 2, bent portions are formed on both sides of a casing accommodating the zigzag spring to support the zigzag spring thereby preventing the zigzag spring from buckling.

However, with this method, both sides of the zigzag spring may slide inside the bent portion thereby preventing the zigzag spring from smoothly moving. Further, since the above-described spring unit is structured to support only the sides of the zigzag spring, the zigzag spring may be separated from the bent portions of the casing after the sliding mechanism is frequently moved. Thus, reliability is insufficient.

The present invention is provided in consideration of the above points. An object of the present invention is to provide a spring unit and a sliding mechanism enabled to certainly prevent a zigzag spring from buckling and smoothly expand and contract.

Means for Solving Problems

One aspect of the present invention may be to provide a spring unit including a zigzag spring shaped zigzag; a first sliding unit including a first spring securing part configured to secure a first end of the zigzag spring; a first spring accommodating part configured to accommodate the zigzag spring; first slide guiding parts formed on both sides of the first sliding unit; a second sliding unit including a second spring securing part configured to secure a second end of the zigzag spring; a second spring accommodating part configured to accommodate the zigzag spring; second slide guiding parts formed on both sides of the second sliding unit, wherein the first slide guiding part and the second slide guiding part are engaged so as to be able to mutually slide, and wherein the zigzag spring is held inside a space formed between the first spring accommodating part and the second spring accommodating part while the first slide guiding part and the second slide guiding part are engaged to solve the above points.

Effect of the Invention

According to the embodiment of the present invention, since the zigzag spring is held inside a space formed by oppositely arranged first and second spring accommodating parts and the zigzag spring is held by inner walls of the first and second spring accommodating parts, it is possible to securely prevent the zigzag spring from buckling and to secure a smooth expanding and contracting action.

BRIEF DESCRIPTION OF DRAWINGS

FIG. 3A is a back perspective view of the spring unit of the first embodiment in the expanded state.

BEST MODE FOR CARRYING OUT THE INVENTION

Referring to figures, embodiments of the present invention are described.

Figure 1:
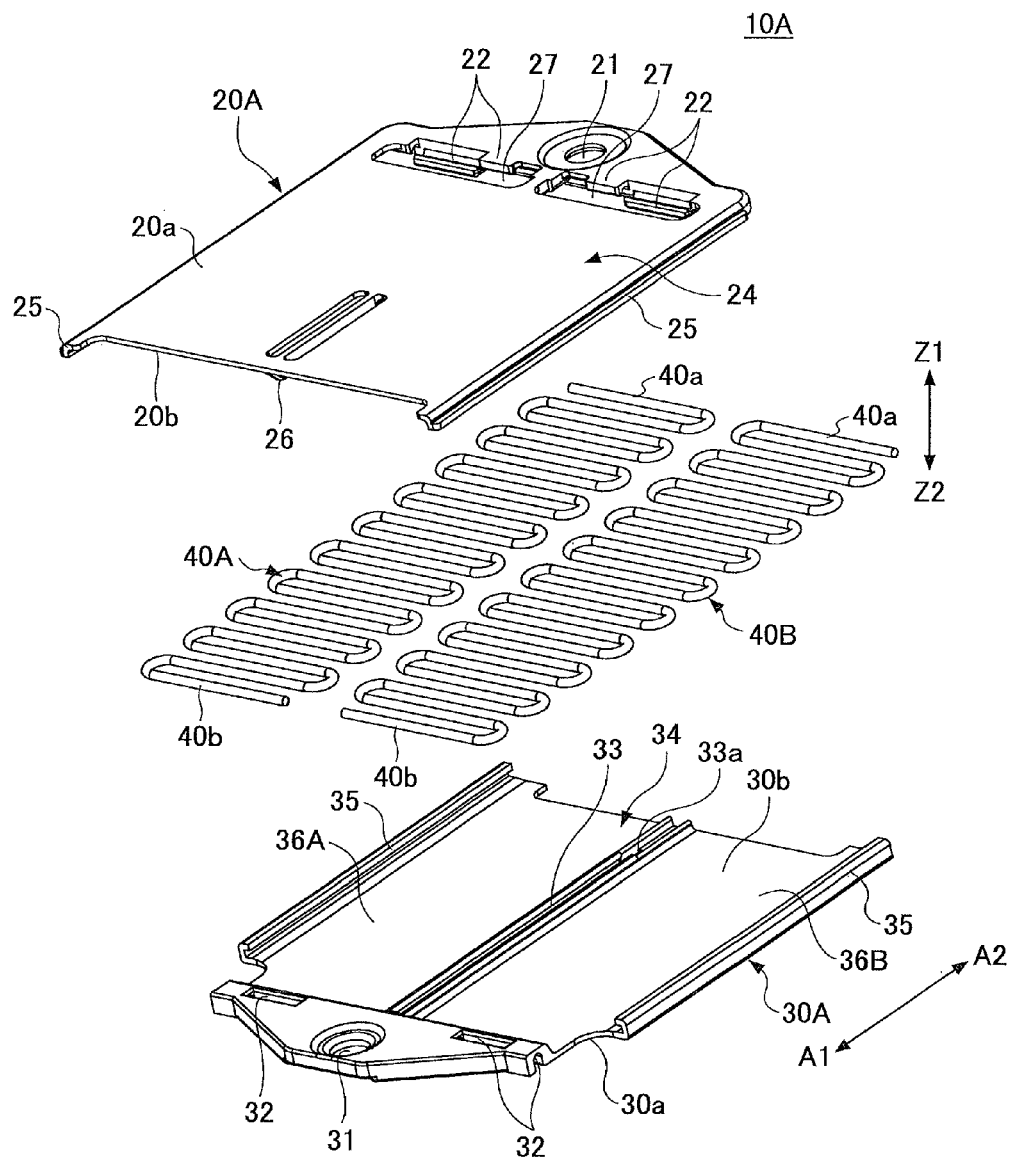
FIG. 1 is an exploded perspective view of a spring unit of a first embodiment.
Figure 2A:
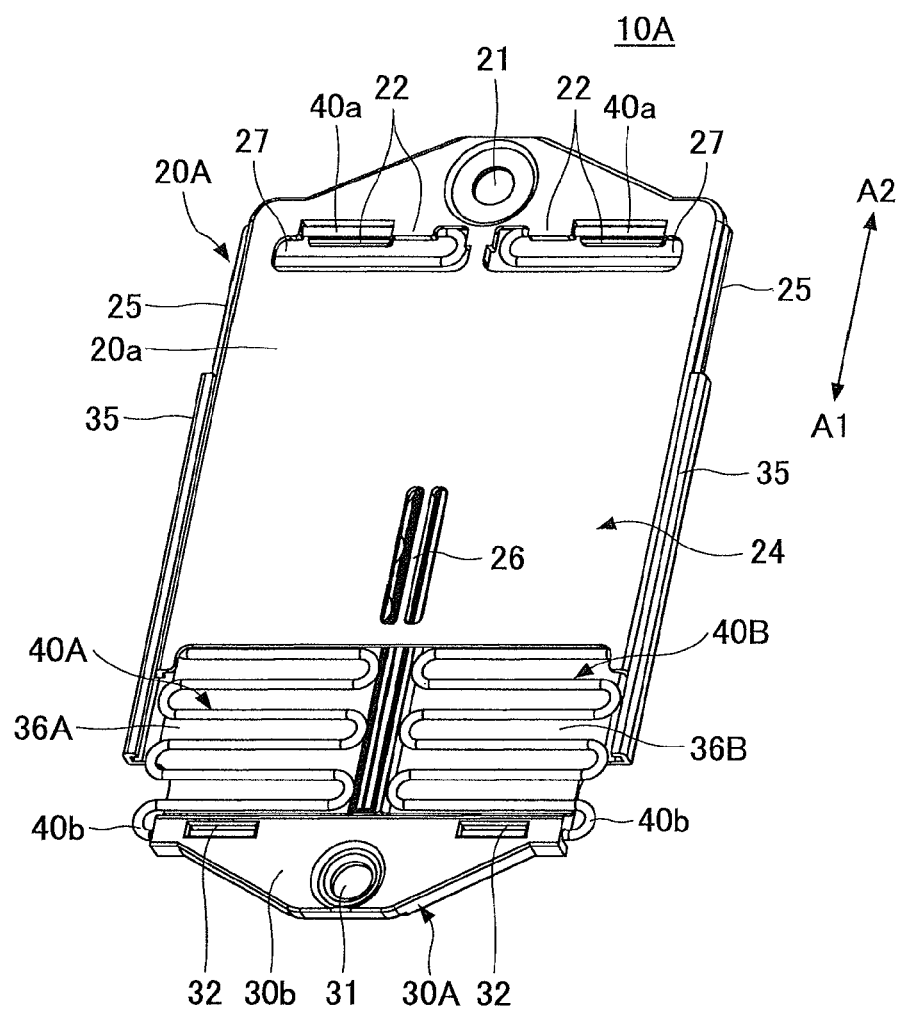
FIG. 2A is a front perspective view of the spring unit of the first embodiment in an expanded state.
Figure 2B:
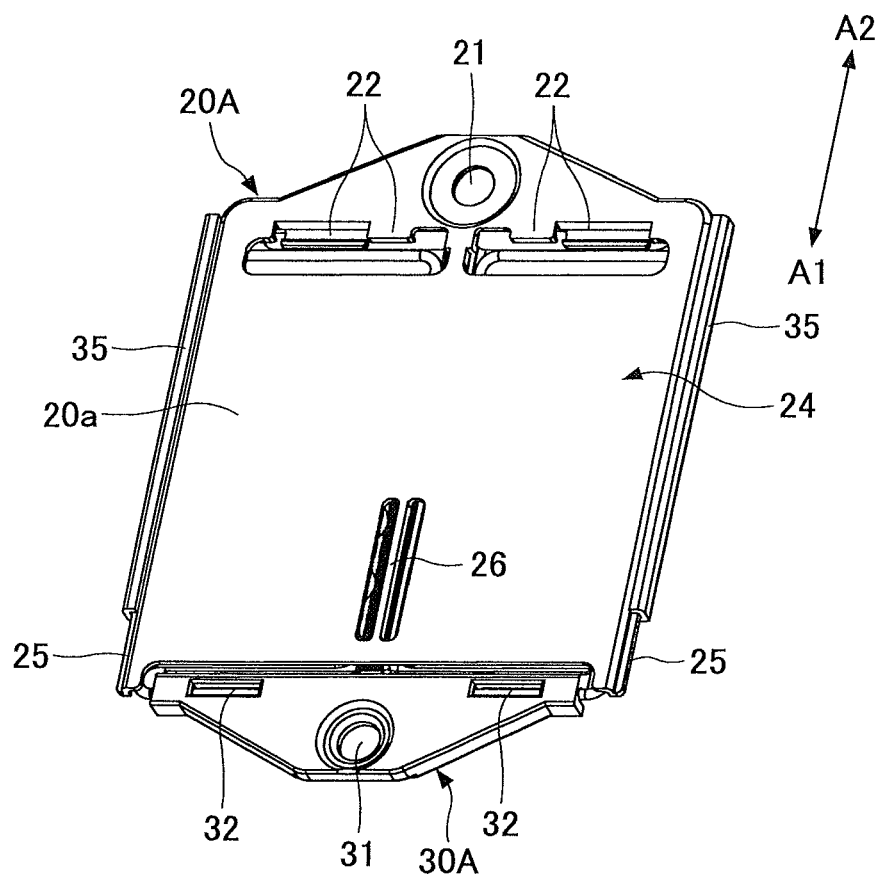
FIG. 2B is a front perspective view of the spring unit of the first embodiment in an contracted state.
Figure 3B:
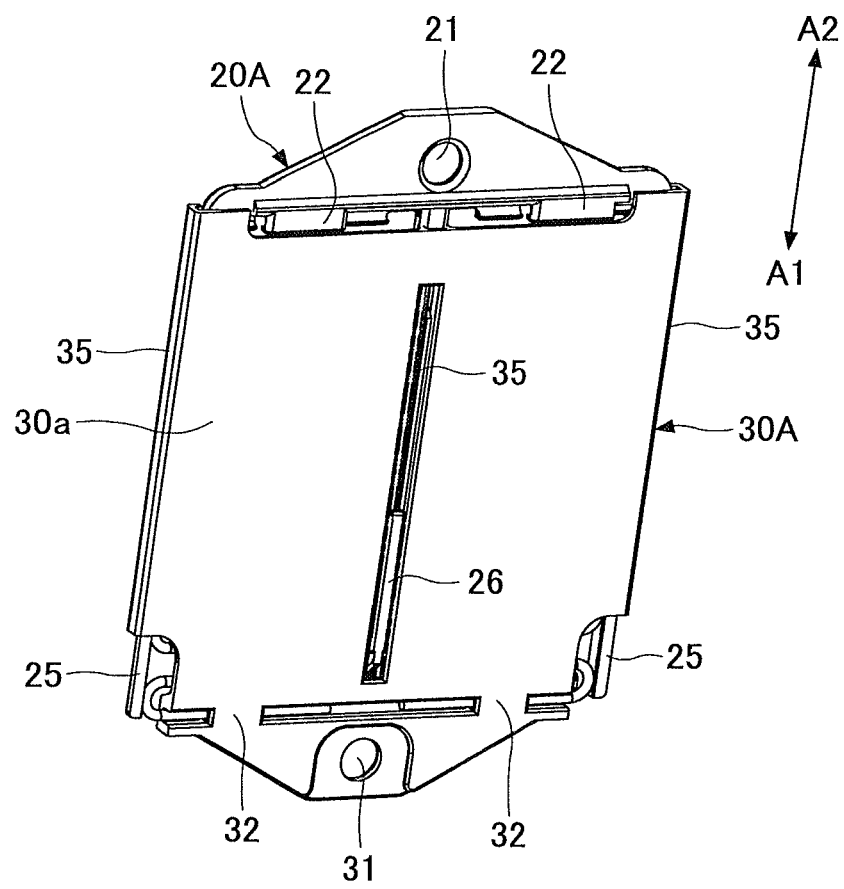
FIG. 3B is a back perspective view of the spring unit of the first embodiment in the contracted state.

FIG. 1 to FIG. 3B illustrate a spring unit 10A of a first embodiment of the present invention. FIG. 1 illustrates an exploded view of the spring unit 10A. FIG. 2 is a front perspective view of the spring unit 10A. FIGS. 3A and 3B are back perspective views of the spring unit 10A.

The spring unit 10A includes a first sliding unit 20A, a second sliding unit 30A, and zigzag springs 40A and 40B. The spring unit 10A of the first embodiment accommodates the two zigzag springs 40A and 40B. The spring unit 10A is provided as an actuator for a siding mechanism 70 (see FIGS. 4 to 7B) installed in an electronic apparatus 90 illustrated in, for example, FIGS. 7A, 7B, 8A and 8B such as a portable phone and a game machine.

At first, a first sliding unit 20A is described. The first sliding unit 20A is a resin molded part and is shaped substantially like a flat plate. The first sliding unit 20A includes a body 24, a first attaching part 21, first spring securing parts 22, first slide guiding parts 25, a first holding part 26, and first spring accommodating parts 28A and 28B.

Figure 4:
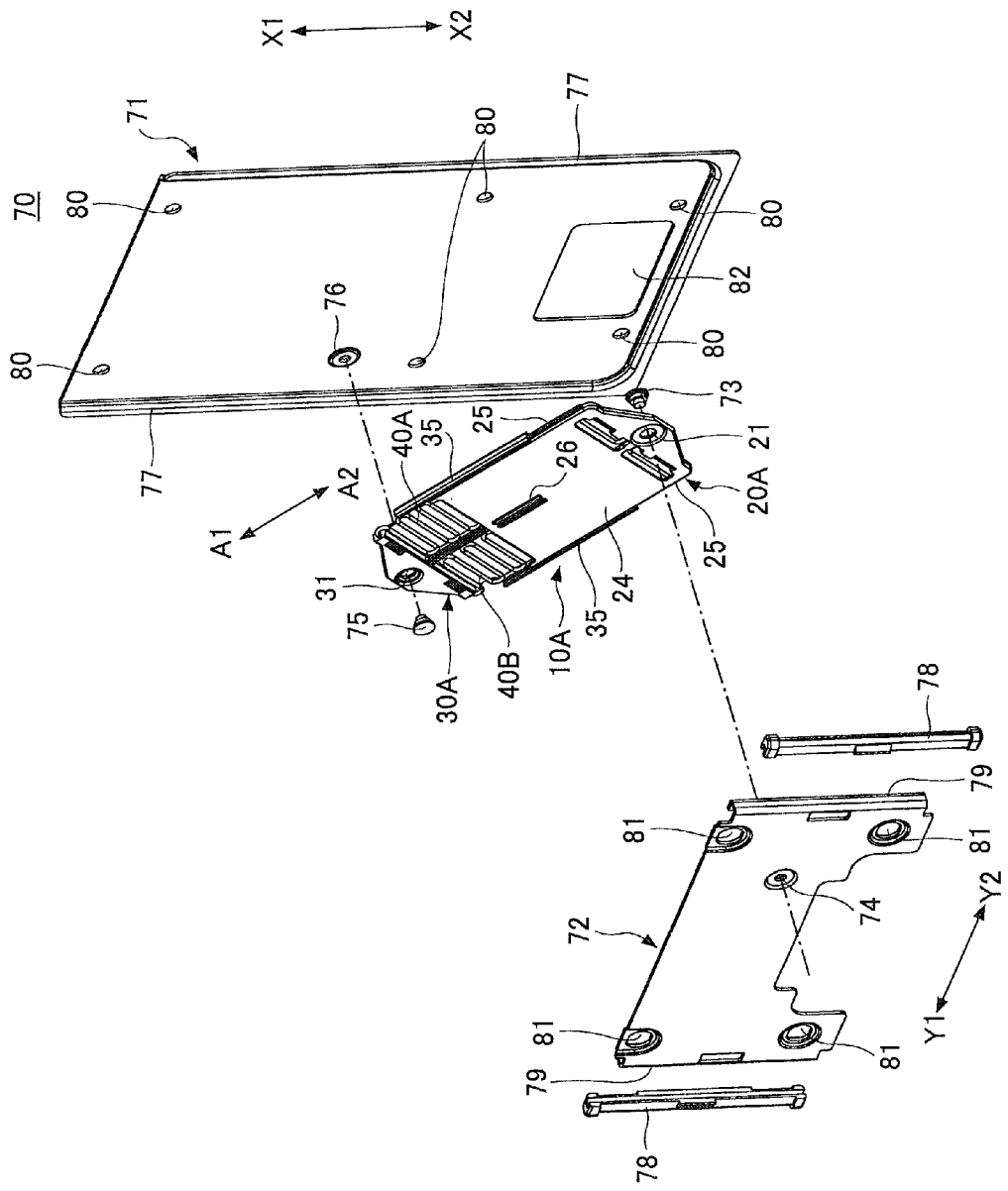
FIG. 4 is an exploded perspective view of the sliding mechanism of the first embodiment.

The first attaching part 21 is formed on an end of the body 24 on a destination side of an arrow A2. The first attaching part 21 penetrates through the body 24. Referring to FIG. 4, when the spring unit 10A is installed in the sliding mechanism described below, a connecting fixed pin 73 is inserted into the first attaching part 21.

The first spring securing parts 22 are engaged with ends 40a (hereinafter, referred to as securing ends 40a) of the zigzag springs 40A and 40B on the destination side of the arrow A2 thereby fixing the securing ends 40a to the first sliding unit 20A. The first spring securing parts 22 are provided in the vicinity of the end of the body in the destination side of the arrow A2.

The first slide guiding parts 25 are formed on both sides of the body 24 so as to extend in expanding and contracting directions (directions of arrows A1 and A2) of the spring unit 10A. The first slide guiding parts 25 are farmed so as to be engaged with the second slide guiding parts 35 formed in the second sliding unit 30A described later. Referring to FIG. 1, the first slide guiding parts 25 are shaped like a rail bent to be substantially like a letter "Z".

Referring to FIG. 3A, the first spring accommodating parts 28A and 28B are formed on a back surface 20b of the body 24. The first spring accommodating part 28A cooperates with a second spring accommodating part 36A described later so as to accommodate the zigzag spring 40A inside a space between the first spring accommodating part 28A and the second spring accommodating part 36A. The first spring accommodating part 28B cooperates with a second spring accommodating part 36B described later so as to accommodate the zigzag spring 40B inside a space between the first spring accommodating part 28B and the second spring accommodating part 36B. The inner surfaces of the first spring accommodating parts 28A and 28B facing the zigzag springs 40A and 40B, respectively, are smooth. Therefore, when the zigzag springs 40A and 40B contact the first spring accommodating part 28A and 28B, friction between the zigzag springs 40A and 40B and the first spring accommodating parts 28A and 28B is small.

The first holding part 26 is provided between the first spring accommodating parts 28A and 28B of the body 24. The first holding part 26 protrudes from the back surface 20b and is engaged with a second holding part 33 of the second sliding unit 30A described later.

Next, the second sliding unit 30A is described. The second sliding unit 30A is a resin molded part and is shaped substantially like a flat plate. The second sliding unit 30A includes a body 34, a second attaching part 31, second spring securing parts 32, second slide guiding parts 35, a second holding part 33, and second spring accommodating parts 36A and 36B.

The second attaching part 31 is formed on an end of the body 34 on a destination side of an arrow A1. The second attaching part 31 penetrates through the body 34. Referring to FIG. 4, when the spring unit 10A is installed in the sliding mechanism described below, a connecting fixed pin 75 is inserted into the second attaching part 31.

The second spring securing parts 32 are engaged with ends 40b (hereinafter, referred to as securing ends 40b) of the zigzag springs 40A and 40B on the destination side of the arrow A1 thereby fixing the securing ends 40b to the second sliding unit 30A. The second spring securing parts 32 are provided in the vicinity of the end of the body in the destination side of the arrow A1.

The second slide guiding parts 35 are formed on both sides of the body 34 so as to extend in the expanding and contracting directions (the directions of the arrows A1 and A2) of the spring unit 10A. The second slide guiding parts 35 are formed so as to be engaged with the first slide guiding parts 25 formed in the first sliding unit 20A described above.

Referring to FIG. 1, the second slide guiding parts 35 are shaped like a rail bent to be substantially like a letter "U". The first slide guiding parts 25 are shaped like a rail bent to be substantially like a letter "Z". The portions substantially shaped like a letter "Z" of the first slide guiding parts 25 are engaged with the portions substantially shaped like a letter "U" of the second slide guiding parts 35. Therefore, the first sliding unit 20A is engaged with the second sliding unit 30A so as to be able to slide along the arrows A1 and A2.

The second spring accommodating parts 36A and 36B are formed on a back surface 30b of the body 34. The second spring accommodating part 36A cooperates with the first spring accommodating part 28A described above so as to accommodate the zigzag spring 40A inside the space between the first spring accommodating part 28A and the second spring accommodating part 36A. The second spring accommodating part 36B cooperates with the first spring accommodating part 28B described above so as to accommodate the zigzag spring 40B inside the space between the first spring accommodating part 28B and the second spring accommodating part 36B.

The inner surfaces of the second spring accommodating parts 36A and 36B facing the zigzag springs 40A and 40B, respectively, are smooth in a similar manner to the first spring accommodating parts 28A and 28B. Therefore, when the zigzag springs 40A and 40B contact the second spring accommodating part 36A and 36B, friction between the zigzag springs 40A and 40B and the second spring accommodating parts 36A and 36B is small.

The second holding part 33 is provided between the second spring accommodating parts 36A and 36B of the body 34 so as to extend along the expanding and contracting directions (the directions A1 and A2). The second holding part 33 is shaped like a rail. The first holding part 26 is engaged with the second holding part 33 so as to be able to relatively slide on the second holding part.

The first and second holding parts 26 and 33 are positioned substantially on a center of the first and second sliding units 20A and 30A. When the first holding part 26 is engaged with the second holding part 33, a movement of the first and second sliding units 20A and 30A in the thickness directions is restricted. Deformation along the arrows Z1 and Z2 in FIG. 1 is restricted. Said differently, the first holding part 26 and the second holding part 33 function as a holding mechanism for integrally maintaining a distance between the first sliding unit 20A of the body 24 and the second sliding unit 30A of the body 34.

A locking part 33a is formed at the end of the second holding part 33 on the destination side of the arrow A2. When the first sliding unit 20A relatively slides on the second sliding unit 30A along the arrow A2, the first holding part 26 contacts the locking part 33a to thereby stop further sliding motion.

The zigzag springs 40A and 40B are formed by bending a wire rod so as to be in a shape like a meander. The zigzag springs 40A and 40B formed by bending the wire rod in the shape like a meander can make the thickness of the spring unit 10A along arrows Z1 and Z2 thin. Therefore, the spring unit 10A is thinner.

In order to assemble the spring unit 10A, the securing ends 40a of the zigzag springs 40A and 40B are engaged with the first spring securing parts 22 of the first sliding unit 20A, and the securing ends 40b of the zigzag springs 40A and 40B are engaged with the second spring securing parts 32 of the second sliding unit 30A. Further, the first slide guiding parts 25 are engaged with the second slide guiding parts 35, and the first holding part 26 is engaged with the body 34.

With this, the first spring accommodating part 28A faces the second spring accommodating part 36A, and the first spring accommodating part 28B faces the second spring accommodating part 36B. Thus, the zigzag springs 40A is held inside the space formed by the first and second spring accommodating parts 28A and 36A. The zigzag spring 40B is held inside the space formed by the first and second spring accommodating parts 28B and 36B.

When the first slide guiding part 25 is engaged with the second slide guiding part 35, the first sliding unit 20A and the second sliding unit 30A is mutually slidable in the expanding and contracting direction along the arrows A1 and A2. When the spring unit 10A is assembled, the first holding part 26 is inserted along A1 to the body 34 so as to be engaged with the second holding part 33. At this time, the first holding part 26 once passes through the locking part 33a. However, after the first holding part moves beyond the locking part 33a along the arrow A1, even if the first sliding unit 20A is moved along the arrow A2 on the second sliding unit 30A, the first holding part 26 is engaged with the locking part 33a so as not to be dropped off.

Next, the operation of the spring unit 10A is described.

Referring to FIGS. 2A, 2B, 3A and 3B, the operation of the spring unit 10A is described. FIGS. 2A and 2B illustrate the front of the spring unit 10A. FIGS. 3A and 3B illustrate the back of the spring unit 10A. Referring to FIGS. 2A and 3A, the spring unit 10A is expanded (hereinafter, referred to as an expanded state). Referring to FIGS. 2B and 3B, the spring unit 10A is contracted (hereinafter, referred to as a contracted state).

Referring to FIGS. 2A and 3A, the first sliding unit 20A is slid along the arrow A2 relative to the second sliding unit 30A by elastic force of the zigzag springs 40A and 40B. Said differently, the second sliding unit 30A is slid along the arrow A1 relative to the first sliding unit 20A.

Further, in the expanded state, the first holding part 26 is engaged with the locking part 33a of the second holding part 33. Therefore, even if the zigzag spring 40A and 40B are applied with the elastic force in the direction of separating the first and second sliding units 20A and 30A, the first sliding unit 20A is not separated from the second sliding unit 30A.

Further, in the expanded state, parts of the zigzag springs 40A and 40B are exposed outside. Specifically, referring to FIG. 2A, the parts of the zigzag springs 40A and 40B are exposed from the first sliding unit 20A on the destination side of the arrow A1. Specifically, referring to FIG. 3A, the parts of the zigzag springs 40A and 40B are exposed from the second sliding unit 30A on the destination side of the arrow A2.

As described, in the expanded state, the parts of the zigzag springs 40A and 40B are exposed from the first and second sliding units 20A and 30A. However, the exposed parts are limited and held by any one of the first sliding unit 20A or the second sliding unit 30A.

Referring to FIG. 2A, surfaces of the exposed part of the zigzag springs 40A and 40B are exposed from the first sliding unit 20A but back surfaces of the exposed part are held by the second sliding unit 30A. In a manner similar to the above, referring to FIG. 3A, back surfaces of the exposed part of the zigzag springs 40A and 40B are exposed from the second sliding unit 30A but surfaces of the exposed part are held by the first sliding unit 20A. Further, a predetermined range of the zigzag springs 40A and 40B is held by both of the first and second sliding units 20A and 30A.

As described, the spring unit 10 of the first embodiment includes the first and second spring accommodating parts 28A and 36A which are oppositely arranged, the first and second spring accommodating parts 28B and 36B which are oppositely arranged, the zigzag springs 40A and 40B accommodated in the spaces formed between the first and second spring accommodating parts 28A and 36A and between the first and second spring accommodating parts 28B and 36B. Therefore, even in the expanded state in which exposed areas of the zigzag springs 40A and 40B increase, the zigzag springs 40A and 40B are held by the first and second sliding units 20A in a wide area. Therefore, it is possible to securely prevent the zigzag springs 40A and 40B from buckling.

From the expanded state, when the first sliding unit 20A slides on the second sliding unit 30A along the arrow A1 (relatively, the second sliding unit 10A slides on the first sliding unit 20A along the arrow A2), the spring unit 10A transitions into the contracted state as illustrated in FIGS. 2B and 3B.

The zigzag springs 40A and 40B tend to buckle in the contracted state. "Buckling" means a great deflection occurring when a load applied to a structural object is gradually increased. At a certain load, the deflection suddenly changes to generate the great deflection. However, in the contracted state of the spring unit 10A of the first embodiment, the zigzag springs 40A and 40B are completely covered by the first and second sliding units 20A and 30A. Said differently, the zigzag springs 40A and 40B are completely accommodated inside the spring accommodating parts 28A, 28B, 36A and 36B. Therefore, it is possible to securely prevent the zigzag springs 40A and 40B from buckling when the first sliding unit 20A contacts the second sliding unit 30A.

Further, because the first sliding unit 20A slides on the second sliding unit 30A while the first slide guiding part 25 is engaged with the second slide guiding part 35, a cross-sectional area of the space formed by the first spring accommodating parts 28A and 28B and the second spring accommodating parts 36A and 36B where the zigzag springs 40A and 40B are accommodated is maintained to be constant. Further, the both ends of the zigzag springs 40A and 40B are secured to the first and second spring securing parts 22 and 32.

Therefore, in an ordinary expanding and contracting action causing no buckling, the zigzag springs 40A and 40B expand or contract while the zigzag springs 40A and 40B are apart from the first spring accommodating parts 28A and 28B and the second spring accommodating parts 36A and 36B. Therefore, it is possible to prevent the zigzag springs from contacting the casing accommodating the zigzag springs thereby enable a smooth expanding and contracting actions of the spring unit 10A without frictional loss caused by the slide motion.

In the spring unit 10A of the first embodiment 10A, the distance between the first and second sliding units is maintained to be constant by the engagement of the first and second holding parts 26 and 33. Further, even if the zigzag springs 40A and 40B are buckled, the first and second sliding units 20A and 30A are prevented from being deformed. With this, even if the zigzag springs 40A and 40B buckle, it is possible to prevent the buckling from effecting the spring unit 10A.

Next, referring to FIGS. 4 to 8B, a sliding mechanism 70 assembled with the spring unit 10A is described.

Figure 5A:
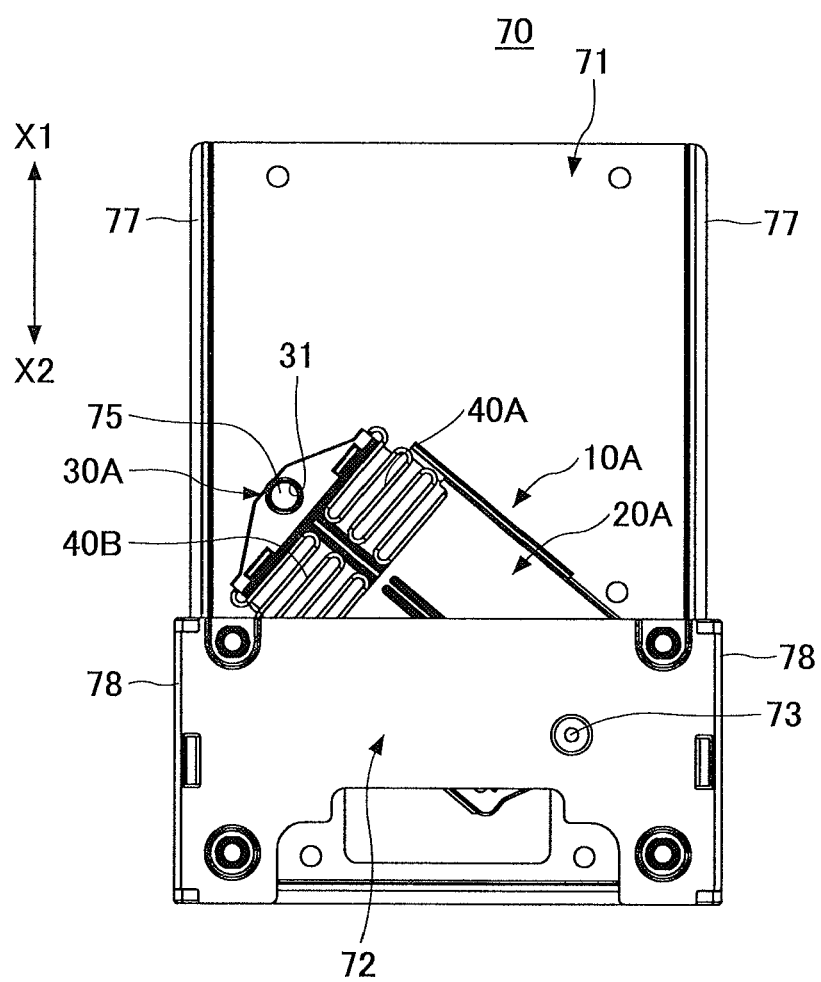
FIG. 5A is a front view of the sliding mechanism of the first embodiment.
Figure 5B:
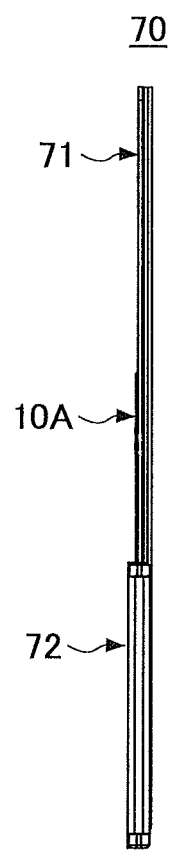
FIG. 5B is a right side view of the sliding mechanism of the first embodiment.
Figure 5C:
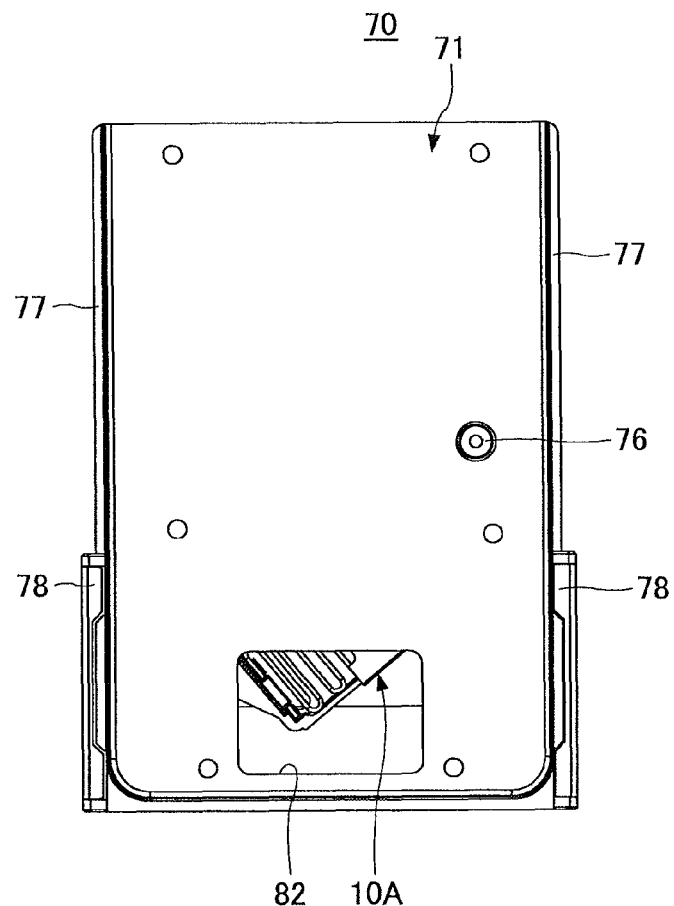
FIG. 5C is a back view of the sliding mechanism of the first embodiment.
Figure 5D:
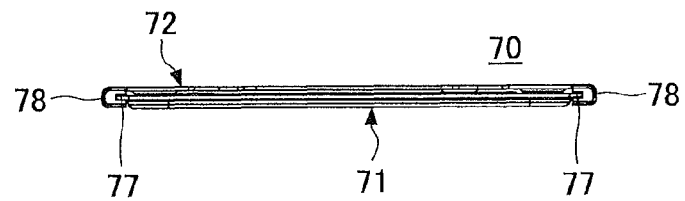
FIG. 5D is a bottom view of the sliding mechanism of the first embodiment.
Figure 6A:
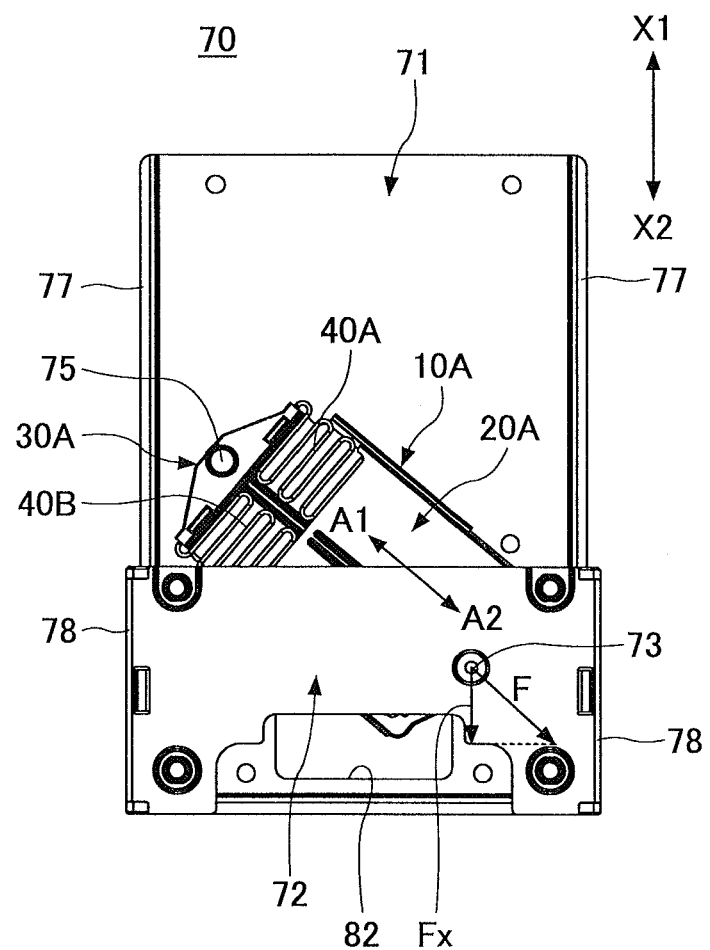
FIG. 6A is a front view of the sliding mechanism of the first embodiment in a closed state.
Figure 6B:
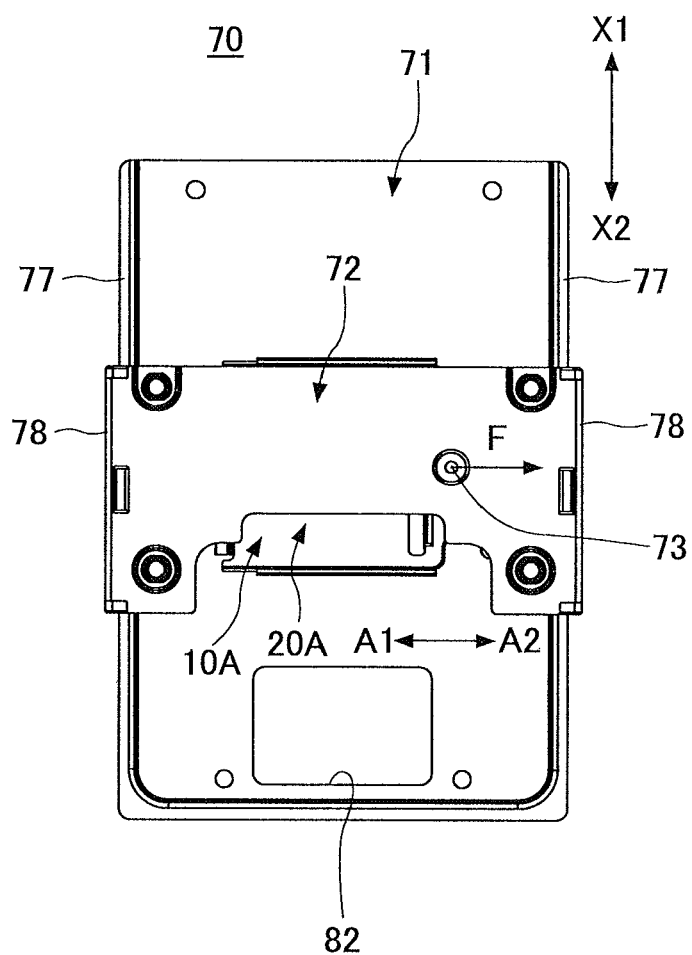
FIG. 6B is a front view of the sliding mechanism of the first embodiment in an intermediate state.
Figure 6C:
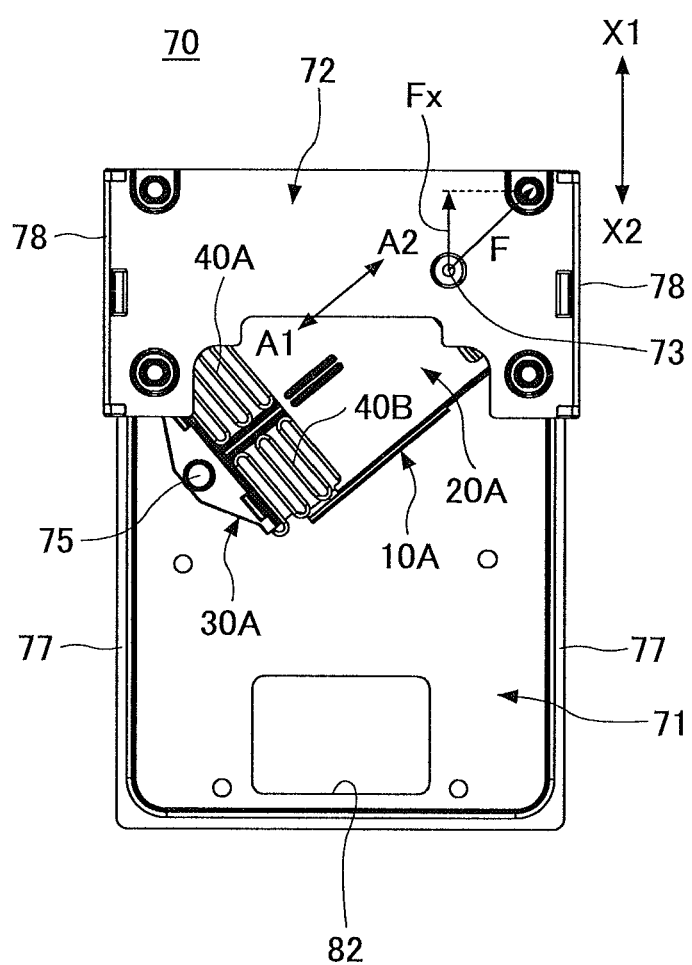
FIG. 6C is a front view of the sliding mechanism of the first embodiment in an opened state.
Figure 7A:
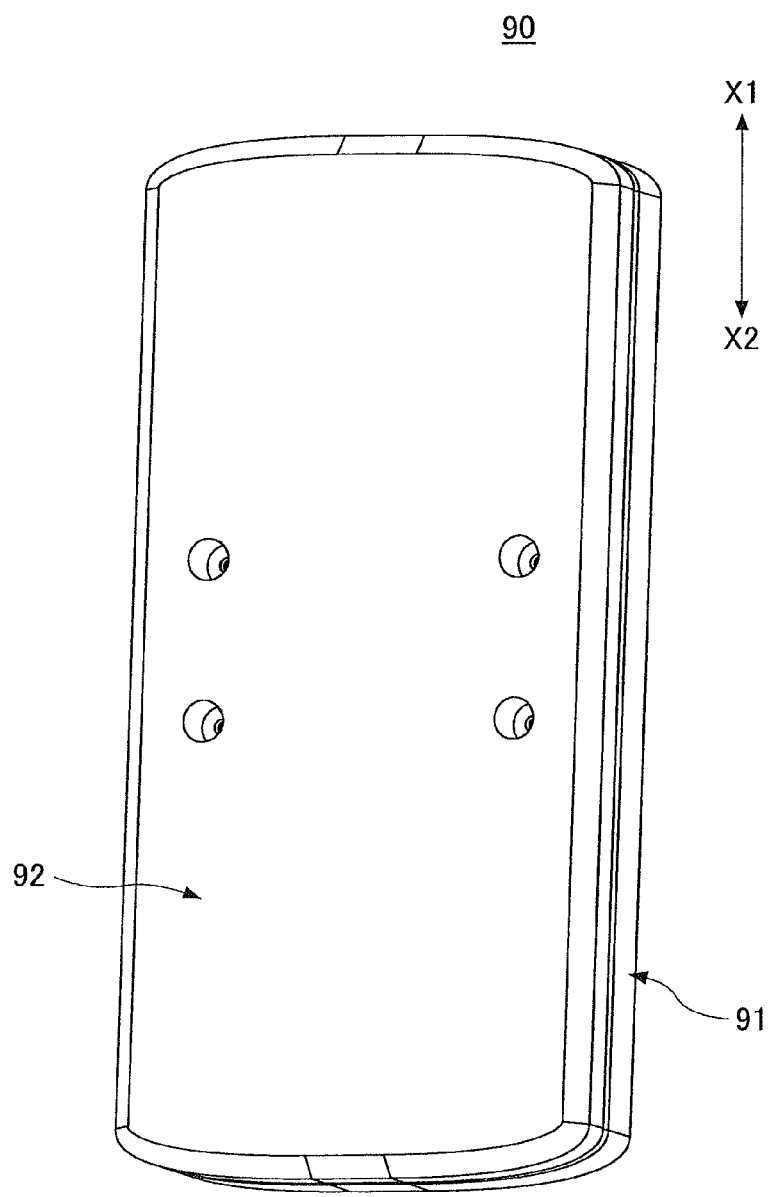
FIG. 7A is a perspective view of an electronic apparatus including the sliding mechanism of the first embodiment in the closed state.
Figure 7B:
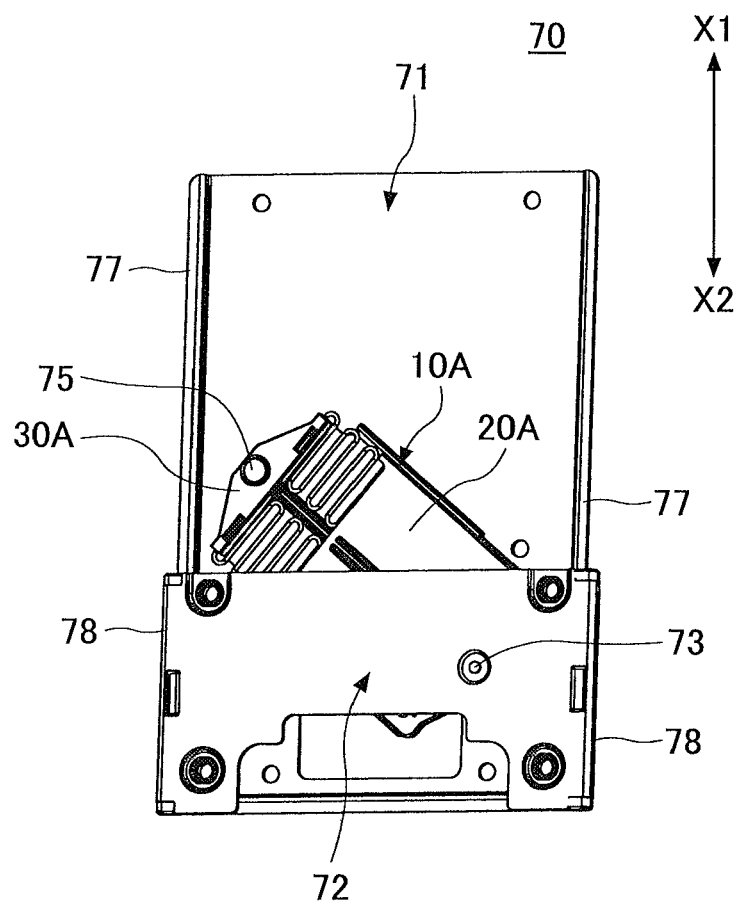
FIG. 7B is a front view of the sliding mechanism of the first embodiment in the closed state.
Figure 8A:
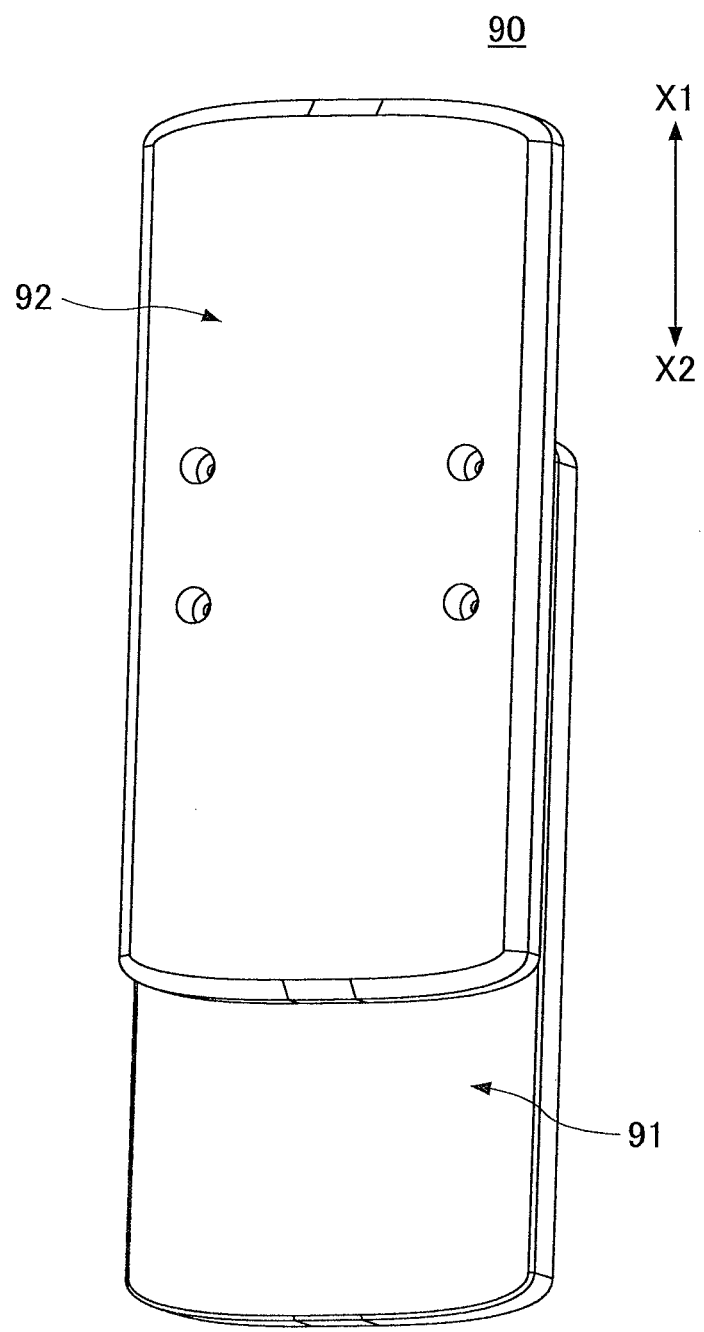
FIG. 8A is a perspective view of an electronic apparatus including the sliding mechanism of the first embodiment in the closed state.
Figure 8B:
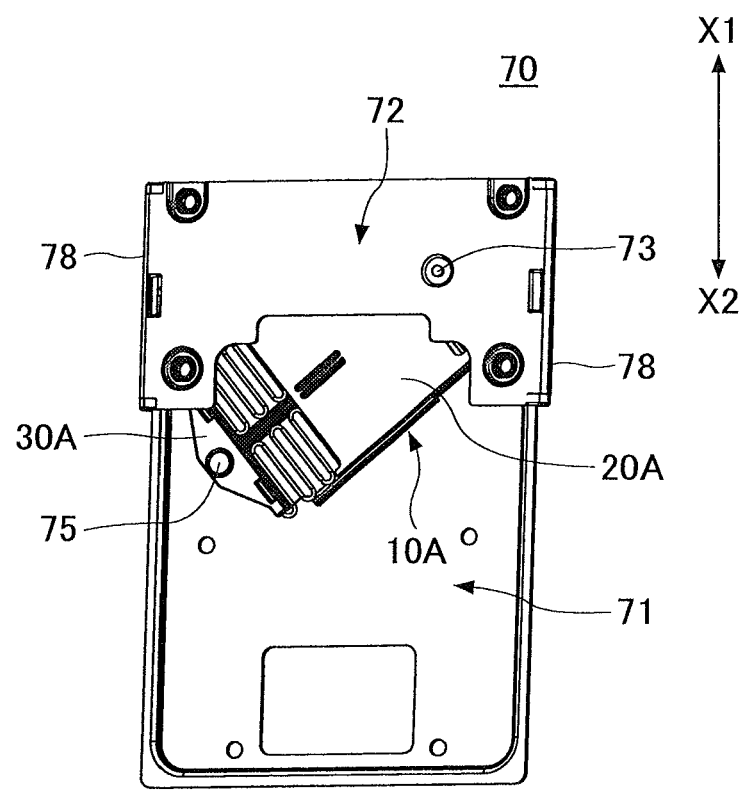
FIG. 8B is a front view of the sliding mechanism of the first embodiment in the closed state.

FIG. 4 is an exploded perspective view of the sliding mechanism 70 in which the spring unit 10A is assembled. FIGS. 5A to 5D illustrate the sliding mechanism 70 in an assembled state. FIG. 5A is a front view. FIG. 5B is a right side view. FIG. 5C is a back surface view. FIG. 5D is a bottom view. FIGS. 6A to 6C are front views for explaining action of the sliding mechanism 70. FIG. 6A illustrates a closed state of the sliding mechanism 70. FIG. 6B illustrates an intermediate state of the sliding mechanism 70. FIG. 6A illustrates an opened state of the sliding mechanism 70. FIGS. 7A and 7B illustrate the closed state of the sliding mechanism 70. FIG. 7A illustrated an electronic apparatus 90 in which the sliding mechanism 70 is installed. FIG. 7B illustrates the sliding mechanism 70. FIGS. 8A and 8B illustrate the opened state of the sliding mechanism. FIG. 8A illustrated the electronic apparatus 90 in which the sliding mechanism 70 is installed. FIG. 8B illustrates the sliding mechanism 70. Although a single sliding mechanism 70 are installed in the electronic apparatus 90 in FIGS. 4 to 8B, the number of the sliding mechanism 70 may be plural.

The sliding mechanism 70 includes a base plate 71, a slide plate 72 and a spring unit 10A or the like. The sliding mechanism 70 is installed in the electronic apparatus 90 having a feature of slide motion such as a portable phone illustrated in FIGS. 7A and 8A.

The base plate 71 is fixed to a fixed casing 91 on which various keys of the portable phone are arranged. The slide plate 72 is fixed to a movable casing 92 on which a liquid crystal display device or the like is installed.

Guide rails 77 are formed on both sides of the base plates 71. The guide rails 77 are formed so as to extend along the arrows X1 and X2. Meanwhile, guide members 78 are attached to side edges 79 on both sides of the slide plate 72.

The guide members 78 are made of a resin material having an easily slipping property. Guide grooves are formed inside the guide members 78 which are engaged with the guide rail 77 along the arrows X1 and X2. By the engagement between the guide rail 77 and the guide member 78, the slide plate 72 is configured to be slidable along the arrows X1 and X2 relative to the base plate 71.

The first attaching part 21 of the spring unit 10A is attached to a shaft supporting part 74 of the slide plate 72 so as to be rotatable by the fixed pin 73, and the second attaching part 31 is attached to a shaft supporting part 76 of the base plate 71 so as to be rotatable by the fixed pin 75. With this, the elastic force of the spring unit 10A effects between the base plate 71 and the slide plate 72.

A screw for fixing the base plate 71 to the fixed casing 91 penetrates through an attaching hole 80. A screw for fixing the slide plate 72 to the movable casing 92 penetrates through an attaching hole 81.

FIGS. 5A to 5D illustrate the sliding mechanism 70 in the assembled state. Referring to FIGS. 5A to 5D, the slide plate 72 is moved along the arrow X2. Referring to FIG. 5A (the front view), the spring unit 10A is rotated in a clockwise direction around the fixed pin 75. Because the zigzag springs 40A and 40B are compression springs, the spring unit 10A is biased in an expanding direction. Therefore, the slide plate 72 is biased along the arrow X2 by the elastic force generated by the spring unit 10A.

However, the slide plate 72 contacts a stopper (not illustrated) provided in the base plate so that the slide plate 72 is prevented from further moving along the arrow X2 from the position illustrated in FIG. 5A. An opening 82 is formed in a center end portion in the destination side of the arrow X2 in FIG. 5A. The opening 82 is provided to insert a flexible board through it when the sliding mechanism 70 is actually installed in the electronic apparatus 90.

Referring to FIGS. 6A to 8B, the action of the sliding mechanism 70 is described.

Hereinafter, the action of the sliding mechanism changing from the closed state to the opened state is described. However, description of the action of the sliding mechanism changing from the opened state to the closed state is omitted because this action is reverse to the action of the sliding mechanism changing from the closed state to the opened state.

FIGS. 6A, 7A, and 7B illustrated the sliding mechanism 70 in the closed state. In the closed state, the slide plate 72 is slid along the arrow X1 relative to the base plate 71. In the closed state, the spring unit 10A is rotated in the clockwise direction around the fixed pin 75 as described above. Therefore, the zigzag springs 40A installed inside the and 40B are in the expanded state. Further, in the closed state, the fixed casing 91 overlaps the movable casing 92 as illustrated in FIG. 7A.

When the operator moves the slide plate 72 along the arrow X1 from the closed state, the fixed pin 73 connecting the slide plate 72 to the spring unit 10A starts to move in the direction X1. Simultaneously, the spring unit 10A is rotated in the counter-clockwise direction around the fixed pin 75 fixed to the base plate 71. With this, the first sliding unit 20A slides along the arrow A1 relative to the second sliding unit 30A to thereby compress the zigzag springs 40A and 40B.

With this contraction, the zigzag springs 40A and 40B accumulates the elastic force to thereby bias the first and second sliding units in the expanding direction. Thus, the spring unit 10A functions as the actuator of sliding the slide plate 72 by biasing the spring unit 10A in the expanding direction with the elastic force F illustrated by an arrow F in FIGS. 6A, 6B, and 6C.

FIG. 6B illustrates a state in which the slide plate 72 slides so that the fixed pin 73 and the fixed pin 75 are substantially horizontally arranged (hereinafter, referred to as an intermediate state). In the intermediate state, the spring units 10A are rotated so as to be substantially horizontally arranged. In this intermediate state, the zigzag springs 40A and 40B installed inside the spring unit 10A are compressed mostly by the slide plate 72.

While the slide plate 72 changes from the closed state to the intermediate state, the spring unit 10A is in the clockwise direction from the horizontal position in the intermediate state. Therefore, the component force of the elastic force F generated by the spring unit 10A functions along the arrow X2 so as to return the slide plate 72 in the closed state as illustrated in FIG. 6A. Therefore, if the motion of the slide plate 72 along the arrow X1 is stopped before reaching the intermediate state, the slide plate 72 returns in the closed state by the elastic force generated by the spring unit 10A.

On the contrary thereto, if the slide plate 72 is further slid along the arrow X1 from the intermediate state, the direction of the biased force of the elastic force F to the slide plate 72 by the spring unit lap, is reversed. While the slide plate 72 changes from the intermediate state to the opened state, the spring unit 10A is in the counter-clockwise direction from the horizontal position in the intermediate state. Therefore, the component force of the elastic force F generated by the spring unit 10A functions along the arrow X1 so as to forward the slide plate 72 in the opened state as illustrated in FIG. 6C.

Therefore, if the slide plate 72 is slid in the direction X1 over the position in the intermediate state, even if the slide motion is stopped then, the elastic force F generated by the spring unit causes the slide plate to automatically move so as to be in the opened state. In the opened state, as illustrated in FIG. 8A, the movable casing 92 is slid in the direction X1 relative to the fixed casing 91.

FIGS. 9 to FIG. 11B illustrate a spring unit 10B of a second embodiment of the present invention.

Figure 9:
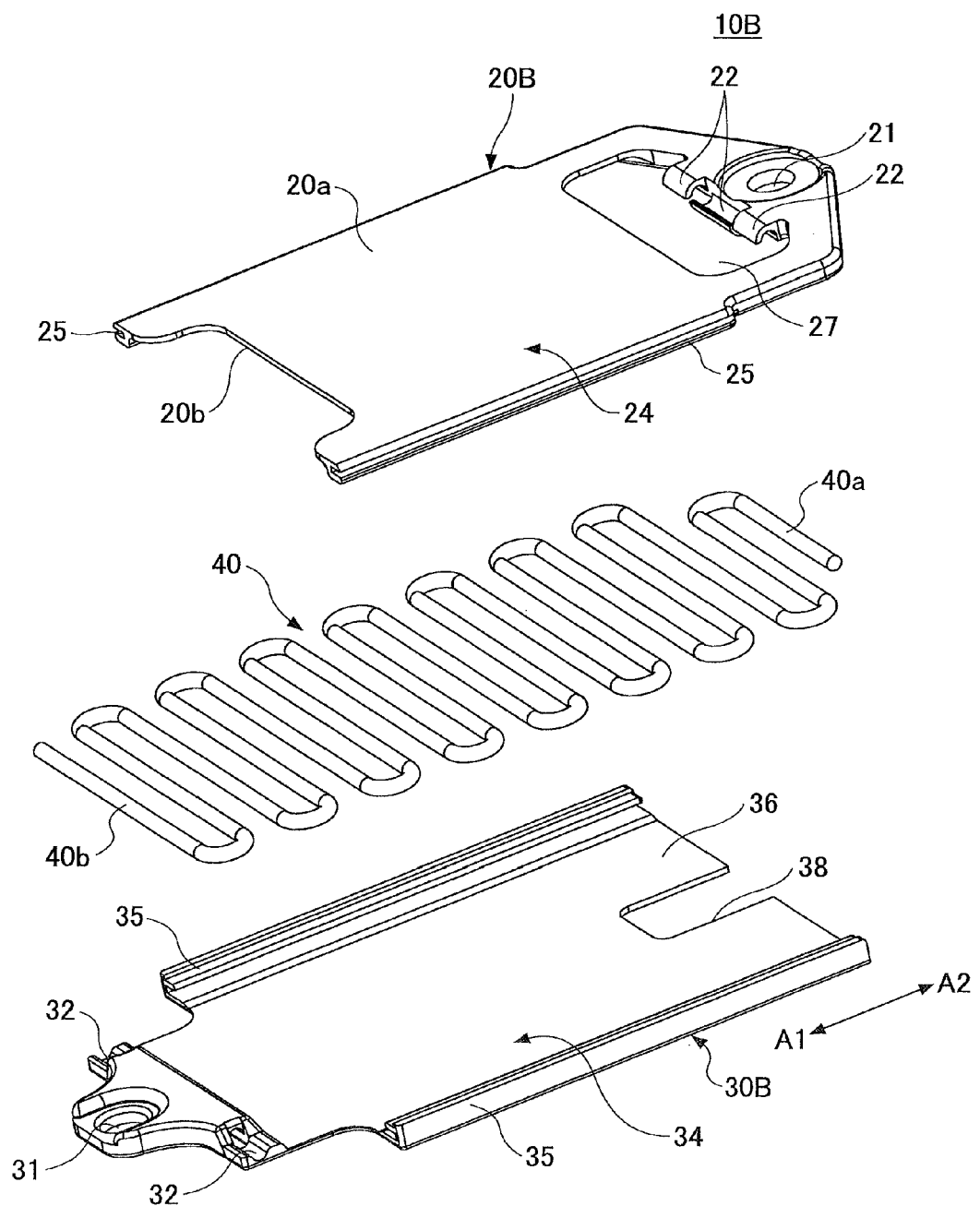
FIG. 9 is an exploded perspective view of a spring unit of a second embodiment.
Figure 10A:
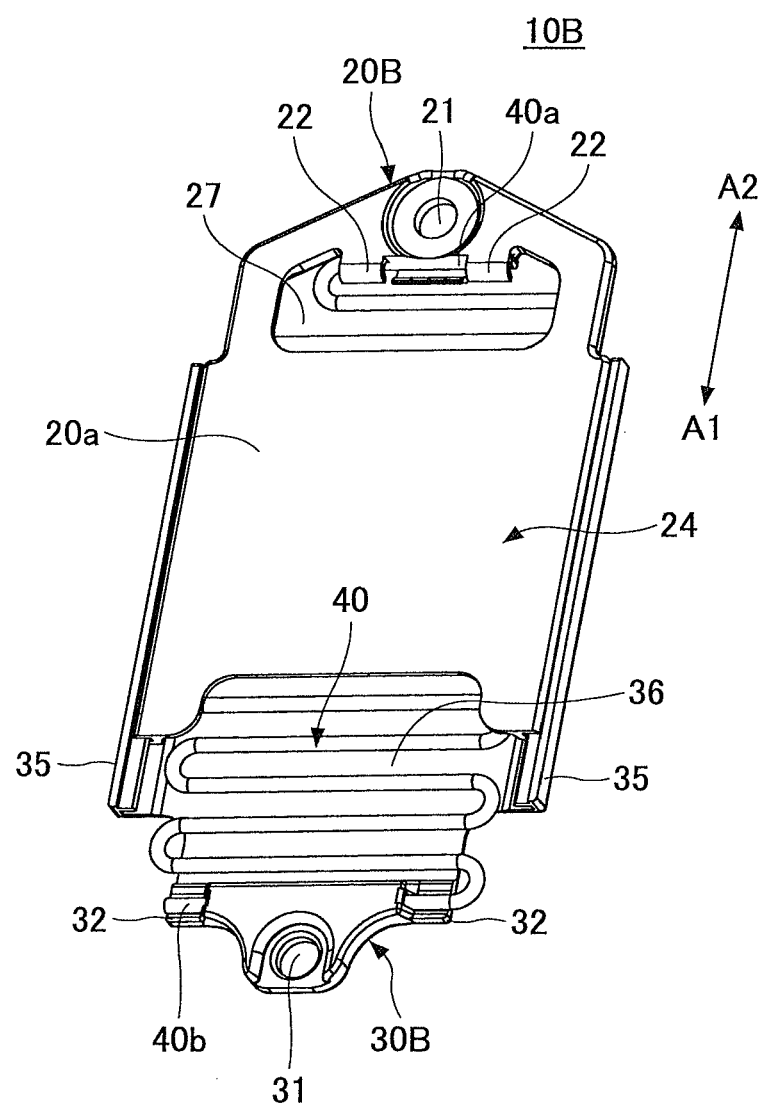
FIG. 10A is a front perspective view of the spring unit of the second embodiment in an expanded state.
Figure 10B:
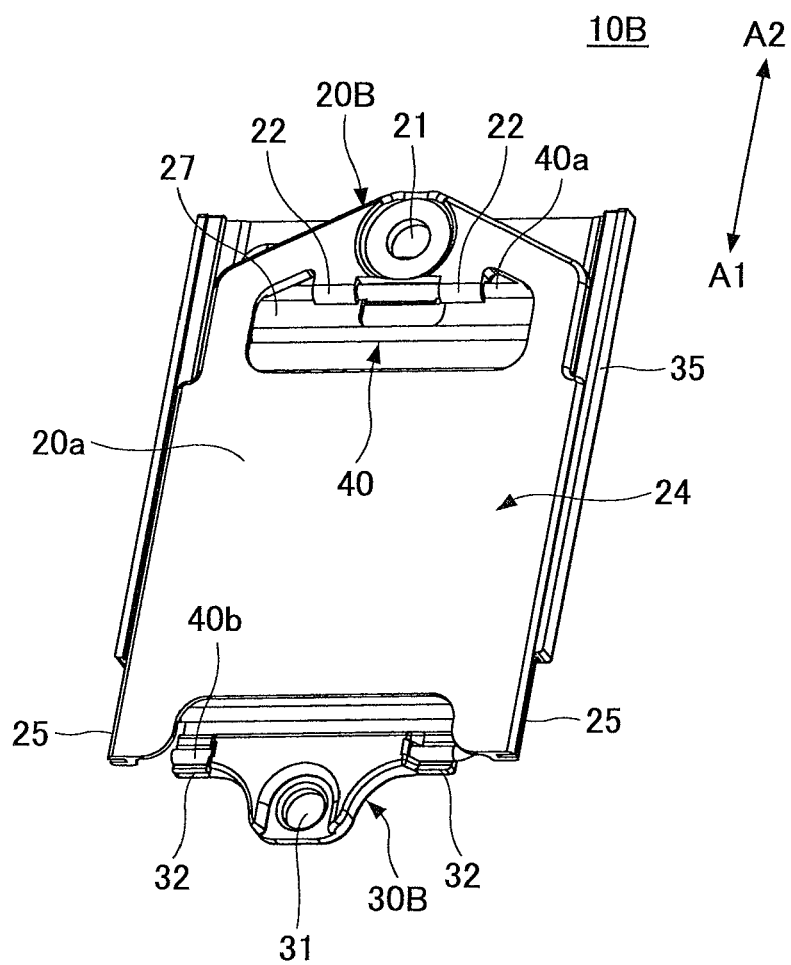
FIG. 10B is a front perspective view of the spring unit of the second embodiment in a contracted state.
Figure 11A:
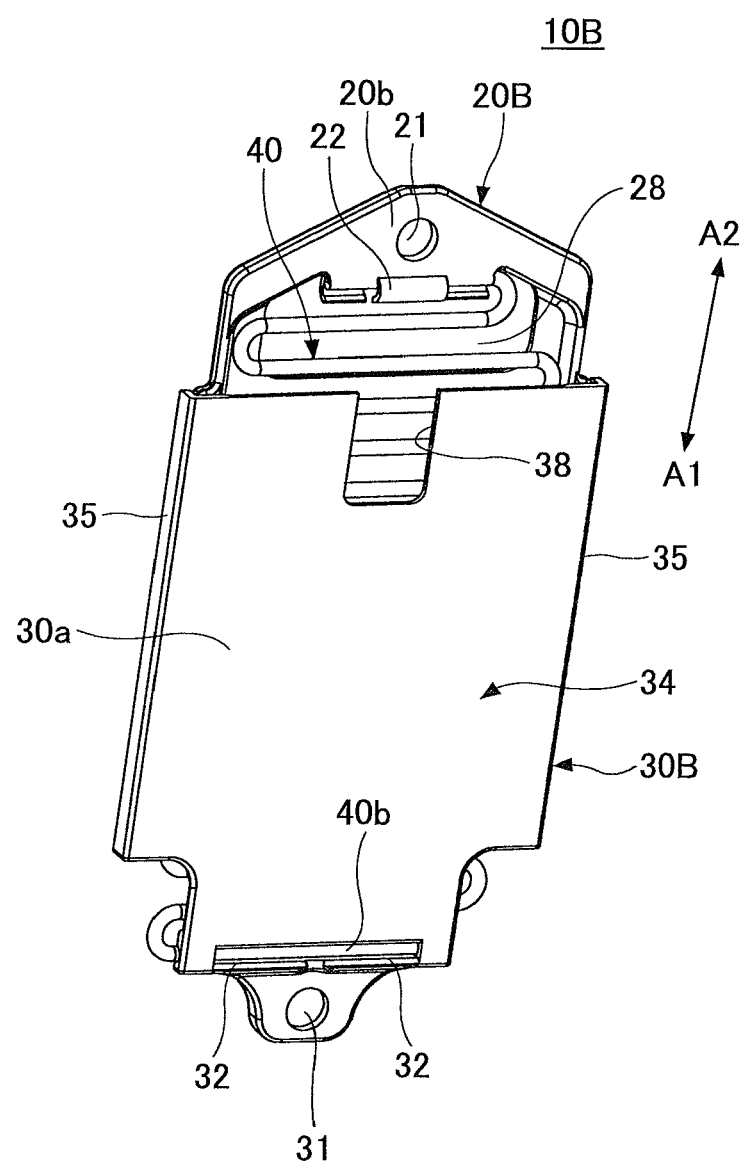
FIG. 11A is a back perspective view of the spring unit of the second embodiment in the expanded state.
Figure 11B:
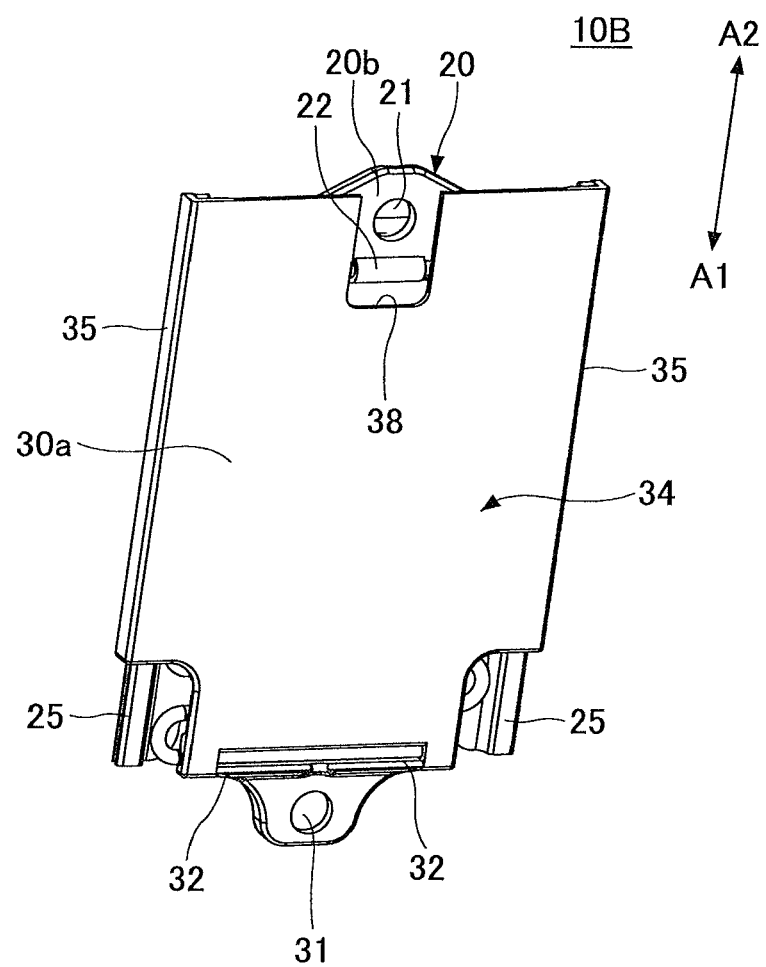
FIG. 11B is a back perspective view of the spring unit of the second embodiment in the contracted state.

FIG. 9 is an exploded perspective view of the spring unit 10B of the second embodiment. FIGS. 10A and 10B are front views of the spring unit 10B. FIGS. 11A and 11B are back views of the spring unit 10B. FIGS. 10A and 11A illustrate the expanded state, and the FIGS. 10A and 11A illustrate the contracted state. Referring to FIGS. 9 to 11, the same reference symbols are given to portions corresponding to the components of the spring unit 10A, and description of these portions is omitted.

The spring unit 10A described in the first embodiment includes the two zigzag springs 40A and 40B inside the first and second sliding units 20A and 30A. Meanwhile, the spring unit 10B of the second embodiment is characterized to accommodate a single zigzag spring 40 inside first and second sliding units 20B and 30B.

In the spring units 10B of the second embodiment, a securing end 40a of the zigzag spring 40 is secured to a first spring securing part 22 formed in the first sliding unit 20B, and a securing end 40b of the zigzag spring 40 is secured to a second spring securing part 32 formed in the second sliding unit 30B. Further, a first spring accommodating part 28 is formed in the first sliding unit 20B and a second spring accommodating part 36 is formed in second sliding unit 30B. The zigzag spring 40 is accommodated in a space formed between the first spring accommodating part 28 and the second spring accommodating part 36.

Further, first slide guiding parts 25 are formed on both sides of a body 24 of the first sliding unit 20B, and second slide guiding parts 35 are formed on both sides of a body 34 of the second sliding unit 30B so that the first slide guiding part 25 is slidably engaged with the second slide guiding part 35. Therefore, in the spring unit 10B of the second embodiment, the zigzag spring 40 is apart from inner walls of the first and second spring accommodating parts 28 and 36 while the zigzag spring 40 ordinarily expands or contracts without buckling. A holding mechanism for maintaining a constant distance between the first sliding unit 20B and the second sliding unit 30B may be formed by the first slide guiding part 25 and the second slide guiding part 35.

As in the second embodiment, even if the number of the zigzag spring 40 is one, an effect and a function similar to those in the spring unit 10A of the first embodiment can be realized. The number of the zigzag springs accommodated inside the first and second sliding units is not limited to one or two and may be appropriately selected. When plural zigzag springs are provided, it is preferable to provide a holding mechanism such as the first and second holding parts 26 an 31 of the first embodiment to prevent the first and second sliding units from deforming.

Within the second embodiment, a recess 38 is formed in the second sliding unit 30B so that the first spring securing part 22 can move inside the recess 38 when the first sliding unit 20B moves in the direction A1 relative to the second sliding unit 30B. With this structure, a sliding distance (a stroke) of the first and second sliding units 20B and 30B can be elongated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2010-054957 filed on Mar. 11, 2010 entire contents of which are hereby incorporated herein by reference.

EXPLANATION OF REFERENCE SIGNS 10A,10B: spring unit
20A,20B: first sliding unit
22: first spring securing part
24: body
25: first slide guiding part
26: first holding part
28,28A,28B,36,36A,36B: spring accommodating part
30A,30B: second sliding unit
32: second spring securing part
33: second holding part
34: body
35: second slide guiding part
40,40A,40B: zigzag spring
70: sliding mechanism
71: base plate
72: slide plate
73: fixed pin
74,76: shaft supporting part
77: guide rail
78: guide member
90: electronic apparatus
91: fixed casing
92: movable casing

The invention claimed is:
1. A spring unit comprising:
a zigzag spring having uniform undulating bends that each comprise a half circle so that from a plan view the zigzag spring has a silhouette of a rectangular flat plate having four 90° corners and having front and back surfaces;
a first sliding unit including
a first spring securing part configured to secure a first end of the zigzag spring;
a first spring accommodating part configured to accommodate the zigzag spring;
first slide guiding parts formed on both sides of the first sliding unit;

a second sliding unit including
- a second spring securing part configured to secure a second end of the zigzag spring;
- a second spring accommodating part configured to accommodate the zigzag spring and be arranged to face the first spring accommodating part;
- second slide guiding parts formed on both sides of the second sliding unit, wherein the first slide guiding parts and the second slide guiding parts are engaged so as to be able to mutually slide, and wherein the zigzag spring is held inside a space formed between the first spring accommodating part and the second spring accommodating part while the first slide guiding parts and the second slide guiding parts are engaged, the spring unit further comprising:

a holding mechanism configured to maintain a constant distance between the first spring accommodating part and the second spring accommodating part, wherein a number of the zigzag spring is plural, wherein the holding mechanism is interposed between the plural zigzag springs.

2. A sliding mechanism comprising:
a base plate;
a slide plate attached to the base plate so that the slide plate is slidable on the base plate; and
a spring unit according to claim 1 provided between the base plate and the slide plate to bias the slide plate on a direction of sliding the slide plate so as to be apart from the base plate.

3. The spring unit according to claim 1,
wherein the first sliding unit and the second sliding unit are made of a resin.

4. A sliding mechanism comprising:
a base plate;
a slide plate attached to the base plate so that the slide plate is slidable on the base plate; and
a spring unit according to claim 3 provided between the base plate and the slide plate to bias the slide plate on a direction of sliding the slide plate so as to be apart from the base plate.

5. A spring unit, comprising:
a zigzag spring having uniform undulating bends that each comprise a half circle so that from a plan view the zigzag spring has a silhouette of a rectangular flat plate having four 90° corners and having front and back surfaces;
a first sliding unit including
- a first spring securing part configured to secure a first end of the zigzag spring;
- a first spring accommodating part configured to accommodate the zigzag spring;
- first slide guiding parts formed on both sides of the first sliding unit;

a second sliding unit including
- a second spring securing part configured to secure a second end of the zigzag spring;
- a second spring accommodating part configured to accommodate the zigzag spring and be arranged to face the first spring accommodating part;
- second slide guiding parts formed on both sides of the second sliding unit, wherein the first slide guiding parts and the second slide guiding parts are engaged so as to be able to mutually slide, and wherein the zigzag spring is held inside a space formed between the first spring accommodating part and the second spring accommodating part while the first slide guiding parts and the second slide guiding parts are engaged, the spring unit further comprising:

a holding mechanism configured to prevent the first and second sliding units from being deformed, wherein a number of the zigzag spring is plural, wherein the holding mechanism is interposed between the plural zigzag springs.

6. A sliding mechanism comprising:
a base plate;
a slide plate attached to the base plate so that the slide plate is slidable on the base plate; and
a spring unit according to claim 5 provided between the base plate and the slide plate to bias the slide plate on a direction of sliding the slide plate so as to be apart from the base plate.

7. The spring unit according to claim 5,
wherein the first sliding unit and the second sliding unit are made of a resin.

8. A sliding mechanism comprising:
a base plate;
a slide plate attached to the base plate so that the slide plate is slidable on the base plate; and
a spring unit according to claim 7 provided between the base plate and the slide plate to bias the slide plate on a direction of sliding the slide plate so as to be apart from the base plate.

9. A spring unit comprising:
a zigzag spring having uniform undulating bends that each comprise a half circle so that from a plan view the zigzag spring has a silhouette of a rectangular flat plate having four 90° corners and having front and back surfaces;
a first sliding unit including
- a first spring securing part configured to secure a first end of the zigzag spring;
- a first spring accommodating part configured to accommodate the zigzag spring;
- first slide guiding parts formed on both sides of the first sliding unit;

a second sliding unit including
- a second spring securing part configured to secure a second end of the zigzag spring;
- a second spring accommodating part configured to accommodate the zigzag spring and be arranged to face the first spring accommodating part;
- second slide guiding parts formed on both sides of the second sliding unit, wherein the first slide guiding parts and the second slide guiding parts are engaged so as to be able to mutually slide, and wherein the zigzag spring is held inside a space formed between the first spring accommodating part and the second spring accommodating part while the first slide guiding parts and the second slide guiding parts are engaged, the spring unit further comprising:

a holding mechanism configured to maintain a constant distance between the first sliding unit and the second sliding unit, wherein a number of the zigzag spring is plural, wherein the plural zigzag springs are shaped like a flat plate and are arranged in a direction perpendicular to an expanding and contracting direction of the zigzag springs inside a space formed between the first and second spring accommodating parts, wherein the holding mechanism is interposed between the plural zigzag springs.

10. A sliding mechanism comprising:
a base plate;
a slide plate attached to the base plate so that the slide plate is slidable on the base plate; and
a spring unit according to claim 9 provided between the base plate and the slide plate to bias the slide plate on a direction of sliding the slide plate so as to be apart from the base plate.

11. The spring unit according to claim 9,
wherein the first sliding unit and the second sliding unit are made of a resin.

12. A sliding mechanism comprising:
a base plate;
a slide plate attached to the base plate so that the slide plate is slidable on the base plate; and
a spring unit according to claim 11 provided between the base plate and the slide plate to bias the slide plate on a direction of sliding the slide plate so as to be apart from the base plate.

* * * * *